United States Patent [19]

Eigenmann

[11] 4,108,536
[45] * Aug. 22, 1978

[54] RETROREFLECTIVE ROADWAY SURFACE MARKING TAPE MATERIAL

[76] Inventor: Ludwig Eigenmann, Vacallo, Canton Ticino, Switzerland

[ * ] Notice: The portion of the term of this patent subsequent to Jun. 22, 1993, has been disclaimed.

[21] Appl. No.: 759,559

[22] Filed: Jan. 14, 1977

[30] Foreign Application Priority Data

Jan. 14, 1976 [IT] Italy ................................ 19246 A/76

[51] Int. Cl.² ............................................. G02B 5/128
[52] U.S. Cl. ...................................... 350/105; 350/97
[58] Field of Search .................................. 350/97–105, 350/106; 404/14

[56] References Cited

U.S. PATENT DOCUMENTS

| | | | |
|---|---|---|---|
| 3,587,415 | 6/1968 | Eigenmann | 350/97 |
| 3,894,791 | 7/1975 | Eigenmann | 350/105 |
| 3,964,820 | 6/1976 | Eigenmann | 350/104 |
| 4,012,114 | 3/1977 | Eigenmann | 350/104 |

*Primary Examiner*—John K. Corbin
*Assistant Examiner*—B. W. delos Reyes
*Attorney, Agent, or Firm*—Michael J. Striker

[57] ABSTRACT

There is described a retroreflective road surface marking tape material of the type having retroreflective systems secured at its upper surface layer, and including new retroreflective systems of elongated and cross-sectionally uniform configuration. There is also described method for forming said material, including preforming the elongated transparent elements of said systems from cutting into pieces an extruded stock transparent material and preferably arranging the resulting elongated systems perpendicularly of the length of the tape of a wider strip adapted to be longitudinally severed in tapes of the desired width.

10 Claims, 11 Drawing Figures

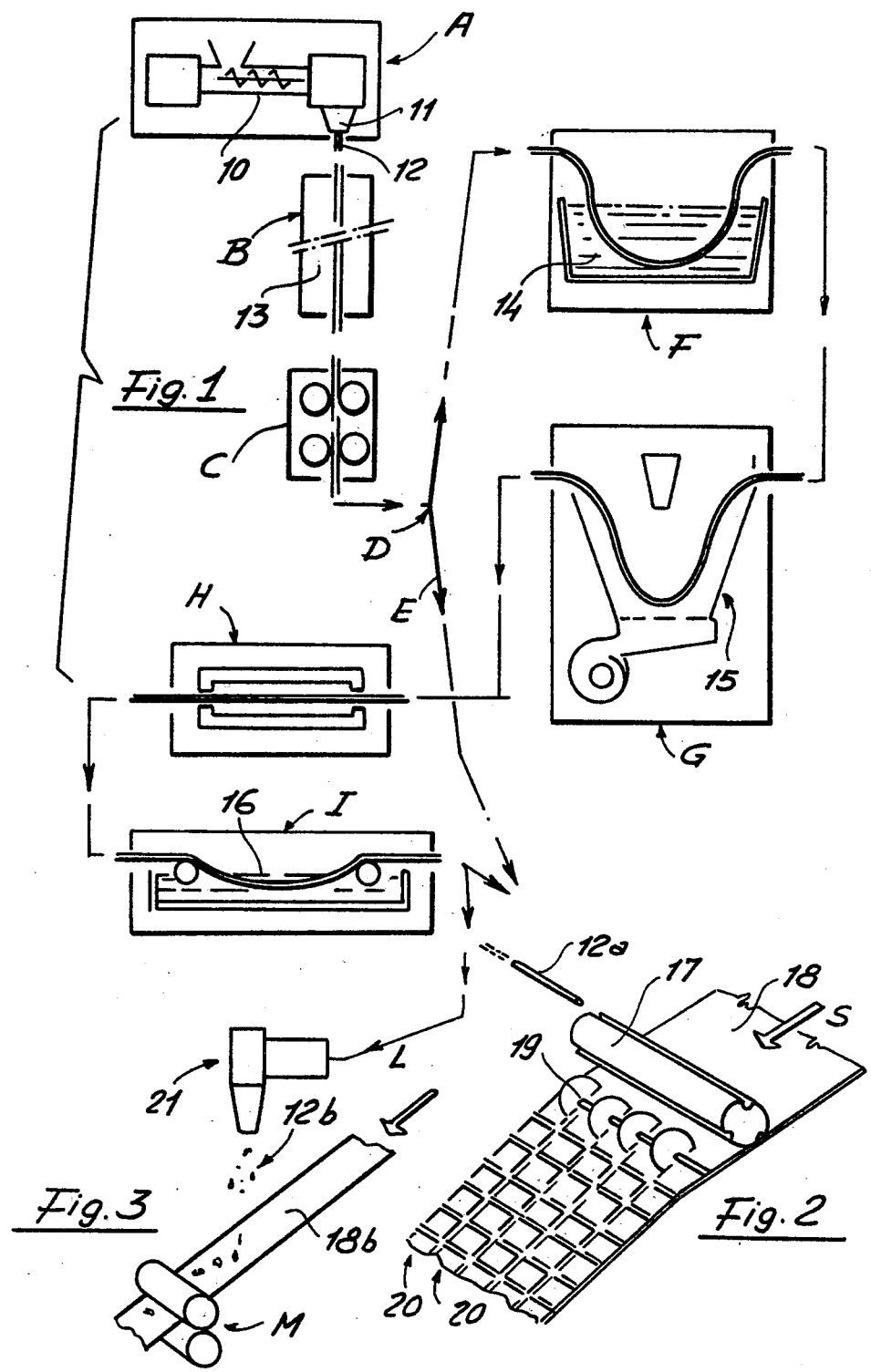

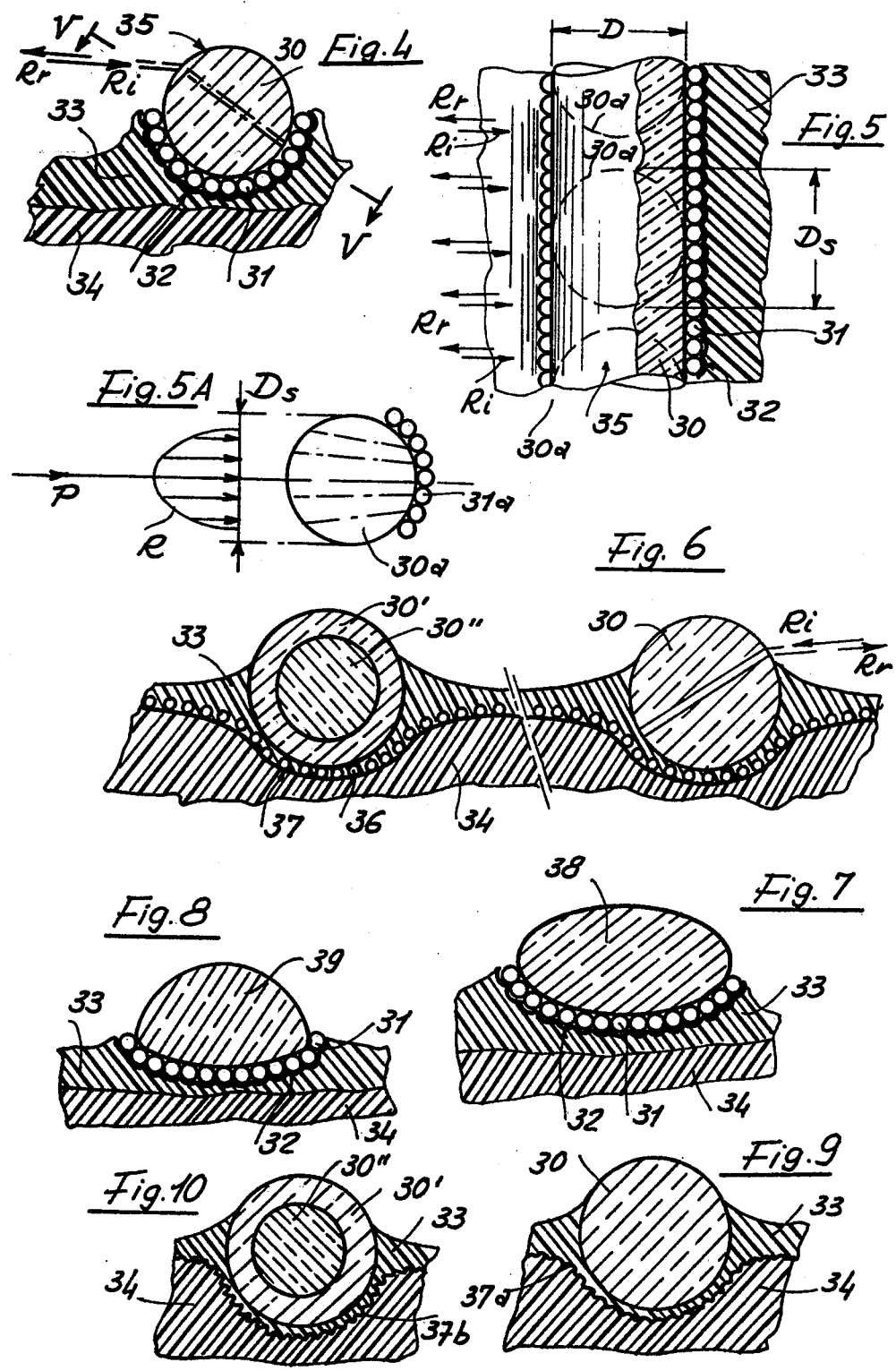

RETROREFLECTIVE ROADWAY SURFACE MARKING TAPE MATERIAL

BACKGROUND OF THE INVENTION

1. Field of the Invention

This invention is concerned with the manufacture of prefabricated tape material designed to be applied on and secured to roadway pavements and other roadable surface for forming traffic dividing and regulating lines and other signs, and to the tape material manufactured by making use of a new and improved method as hereinbelow described. More particularly, the invention is concerned with roadway surface sign forming retroreflective tape material and with a method for producing same.

The term "retroreflective" as hereinafter used in this description and in the appended claims is intended to designate the property of the tape material and more particularly of systems and means forming part of the and secured to its upper or exposed face, which will reflect an incident beam or ray of light in such a manner that a brilliant beam is returned to the source of light, generally a vehicle headlamp system, and therefore towards the vehicle's driver eyes, even if the incident light strikes the surface of the sign and therefore the road surface, at a very small angle (the so called "grazing light"). This property sharply improves the nighttime and bad weather visibility of the sign, when the service of headlamps is required for safety.

2. Description of the Prior Art

Road surface sign-forming retroreflective tape materials are known in the art and extensive comments thereabout are unnecessary, as this art is a well known and worked one. In the specification of the U.S. Pat. No. 3,587,415, granted to the instant applicant, the utility and the principles od retroreflective tape materials have been set forth. This art has been consistently improved and more efficient retroreflective systems have been devised and secured to sign-forming prefabricated tape materials or to signs otherwise formed on road surfaces, such as by painting, by pouring and doctoring hardenable molten or otherwise settable compositions and so on. For example, a number of successively improved retroreflective elements and systems have been disclosed and extensively commented in the patent and technical literature, more particularly in my prior U.S. Pat. Nos. 3,781,083, 3,894,791, 3,964,820, 3,964,821 and 3,981,557.

Generally, each retroreflective element or system comprises a nearly globular or spherical transparent body, partially embedded into the sign-forming tape surface layer (such as of polyurethane or other traffic wear resisting polymeric composition) such as a part-spherical surface bulges above the sign surface, while the lower and embedded portion of said body has reflective means secured adjacently thereto. The light rays which impinges upon the bulging surface is refractively dowardly deviated in said body and strikes on the reflective means for being finally returned along a path nearly close and parallel to that of incidence, towards the source of light. The optical phenomena involved in the retroreflection have been widely commented in the above indicated prior patents, wherein critical data such as relating to indexes of refraction and to various components relationships are also disclosed.

It is an object of this invention to provide a new and further improved retroreflective road surface sign-forming tape material associated to particularly efficient retroreflective elements or systems. Another object of the invention is to provide and advantageous manner for manufacturing such elements or systems and for associating same to a tape material as above.

SUMMARY OF THE INVENTION

Essentially, according to the invention, there are provided elongated retroreflective elements of essentially uniform cross-sectional configuration which, when individually considered, corresponds or is at least similar to the cross-sectional configuration of prior art nearly globular retroreflective elements, taken in a plane essentially parallel to that containing the impinging light beam and perpendicular to the sign surface, said elements being arranged on and secured to the tape upper layer in a direction substantially at 90° of the impinging light, that is, generally, transversally to the sign-forming tape length.

In the new element, therefore, the transparent body consists of a transparent rod having the said cross-sectional uniform configuration, is partially embedded and secured into the tape upper layer preferably extending the entire width thereof, and its embedded portion has preferably reflective means adjacent thereto.

According to an important feature of the invention, the said transparent rod manufactured by means of known die-forming or moulding or extrusion process from transparent polymeric material, such as an acrylic resin is cut into lengths which are at least fifty times the greatest cross-sectional dimension of the rod, and then cut into shorter pieces of length equal to the width of the tape. Preferably, the tape material (of monolayer or known multilayer structure) is manufactured in the form of a strip largely wider than the sign-forming tape, the rod-like retroreflective elements are secured to the upper face (the face which will be upwardly turned in the material on the road) and the thus formed composite strip-like structure is longitudinally severed for forming therefrom a plurality of individually retroreflective tape materials adapted to be coiled into bobbins, carried in the place of use and applied, by making use of known procedures, on the roadway surface for forming the desired traffic regulating sign.

These and other objects, advantages and features of the invention will become apparent from the following detailed description of some not limitative embodiments thereof, taken together with the accompanying drawings.

THE VIEWS OF THE DRAWINGS

FIG. 1 is a block diagram of an apparatus adapted for mass production of the retroreflective components according to a preferred embodiment of the method of the invention;

FIGS. 2 and 3 are diagrammatical perpective views of steps and means for completing the material, according to a preferred embodiment and respectively a modification of the invention;

FIG. 4 is a greatly enlarged fragmentary cross-sectional view of a first embodiment of the retroreflective tape material, taken in a vertical plane (assuming the material in service on a road surface);

FIG. 5 is a sectional view of the same tape, taken in the plane indicated at V—V in FIG. 4;

FIG. 5A illustrates, by way of comparison, a retroreflective element arranged in the same tape, but assuming that such element has been made of globular configuration, according to prior art;

FIG. 6 fragmentarily illustrate a second and a third modified embodiment of the structure of FIG. 4; and FIGS. 7, 8, 9 and 10 are similar views of still further modified embodiments, the embodiment of FIG. 6 including features suggested in my U.S. Pat. No. 3,781,083, while FIG. 7 includes features taken from the teaching of my prior U.S. Pat. No. 3,981,557.

DESCRIPTION OF THE PREFERRED EMBODIMENTS

One important advantage of the invention consists of the fact that the essential refractive transparent components of the retroreflective systems can be manufactured in the manner and by the steps as diagrammatically shown in FIG. 1. In the first step A, an extruder 10 supplies an extrusion head 11 for continuously producing a rod-like stock material 12 having the desired uniform cross-sectional shape, which in step B is quenched at least to substantial plastic state, such as through a cooling environment 13. Step C is a drawing step imparting molecular orientation which improves the physical characteristic of the stock and leads to a decrease of its cross-sectional dimensions. By suitably adjusting the drawing ratio, additionally, such dimensions can be selected at will, according to the request, and the production is increased relatively to the yield of the extruder.

As indicated by arrows originating at D, the extruded and drawn stock can either by transferred in direction E to means designed for applying it (as described below) to the tape material, upon providing it with a known reflective coating, or further processed for providing it with more sophisticated and efficient reflective means, also as examplified below.

In the occurrence that the stock rod-like material will be provided with retroreflective means such as of the tape not limitatively illustrated in any of FIGS. 4, 5, 7 and 8, the method comprises a step F wherein the surface or part of the surface of the stock is coated with an adhesive, such as by passing it in a bath 14, and then a step G wherein the adhesivated tacky surface is provided with any of said reflective means, such as in a "fluid bed" apparatus 15, wherein the beads forming said means are suspended in an air stream into an environment through which the tacky stock is lengthwise progressed. Preferably said beads are caused to impinge on a part only of the surface of the stock for forming a selectively localized monolayer of beads in any of the arrangements of FIGS. 4, 7 or 8, to provide, inter alia, a substantial saving in costly materials.

The thus processed stock is then transferred through a drying oven for performing an adhesive drying step H and then in a finishing bath 16 (step I) wherein a thin coating of a reflective material, such as aluminum, is applied to the stock surface. The aluminum coating which remains on the upper convex surface of the transparent body, in the finished sign-forming tape (FIGS. 4, 7 and 8) is promptly removed by the traffic or, if desired, can be removed by rubbing the formed tape with a basic bath, as well known in the art.

FIGS. 6 (at left) and 8 illustrate embodiments including a composite transparent element of the so called core-sheath type. This structure produced by making use of well known extrusion procedures and apparatuses.

The preferred embodiment of FIG. 3 comprises applying lengths 12a of the rod-like material, by means of a device 17, a longitudinally grooved roller, for example, at given interval on the upper face of a large strip 18 of continuously supplied (in direction S) sign-forming tape material, having a still viscous upper layer. Upon setting of this layer wherein the lengths 12a are supposed to be partially embedded and secured, the large strip is longitudinally severed, for example by means of rotary saws 19, into the tape materials 20 individually of width adapted for use on the road for forming the desired retroreflective sign.

In certain occurrences road surface signs capable of retroreflecting light impinging from different directions are desirable, from example for signalling squares, parking areas and so an. The sign-forming tape can be prepared by making use of the alternative procedure diagrammatically illustrated in FIG. 3. The stock 12, preferably provided with reflective means about its entire surface, is supplied at L into a known cutter device 21 wherein it is cut in very short pieces 12b, such as of length from two to five times its diameter. Said pieces are randomly dropped on the still viscous upper face of the tape material 18b (possibly a large strip to be successively severed as shown in FIG. 2), said pieces being then forced at the desired deepness into the tape 18b, by means of a calendering step M, for example.

Embodiments of the retroreflective systems including elongated elements according the invention, are shown in FIGS. 4 to 10. The advantages thereof will be evident upon jointly considering FIGS. 4, 5 and 5A. In FIGS. 4 and 5 one of the systems secured at intervals along a tape material comprise a cylindrical transparent rod-like element 30 having a monolayer of beads 31 coated by a reflective coating 32 adjacent to the part of said element 30 embedded into the upper layer 33 of a sign-forming tape structure 34. Such structure and the materials of which the same its is made are known in the art, do not form part of this invention and therefore will not be specifically described.

FIG. 4 can be assumed to be either a cross-sectional view of a system according to the invention or of a system according to prior art, wherein the part 30 corresponds to the section of a transparent sphere in one ot its greatest cross-sectional planes. In both occurrences, an impinging light ray Ri, traveling in the plane of the FIGURE, which impinges on the outer convex surface 35 of the system, will be refracted into the transparent body, in a direction approximately as defined by the sectional plane V—V, for being retroreflected as ray Rr.

Now, in the structure of the invention (FIG. 5) the transparent body is a rod of uniform cross-sectional configuration (circular, in the example) extending the most and preferably the entire width of the sign-forming tape. Therefore the phenomenon and the optical effect shown in FIG. 4 occurs in any cross-sectional plane that is in any location of its length. The several arrows Ri and Rr of FIG. 5 visualize this effect. Therefore, the system is retroreflective at its most efficiency for its entire length. By way of comparison, let us assume that the system will comprise, according to prior art, a plurality of individual systems comprising each a known spherical body the trace of which is indicated at 30a in phantom lines. The reflectivity of each of such known systems is indicated in FIG. 5A wherein the curve R approximately illustrates the reflective brilliancy of the system, which has a maximum in its major cross-sectional plane at P—P and sharply decreases at either sides of said plane. This effect will be repeated at any diametral portion $D_s$ in the assumed structure including an alignment of spheres 30a. In the new structure, the reflective brilliancy is equal, in any cross-sectional plane thereof to the maximum attained by the compared known structure in its greatest cross-sectional plane at P—P in FIG. 5A.

The retroreflective system, provided that it has an uniform cross-sectional configuration, can be constructed in a variety of embodiment to be selected according to various consideration as to service requirement, conditions of manufacture and costs. The systems of FIG. 6 includes cylindrical transparent elements partially embedded into an also transparent upper layer 33 of the tape 34, a bed of reflective means being preformed below said layer, said means comprising a monolayer of beads 36 above a reflective sheet 37. This structure is arranged from what suggested in my prior U.S. Pat. No. 3,781,083. In the left part of same FIG. 6, the rod-like transparent is of the core-sheath structure and includes an external layer 30' of transparent material having a refractive index lower than that of the core".

The rod-like transparent element 38 of FIG. 7 has an uniform cross-sectional elliptical configuration and the system is arranged from what suggested in my prior U.S. Pat. No. 3,981,557. The advantageous modification of FIG. 8 comprises a rod-like transparent element 39 of asymmetrical configuration, noticeably flatter in its lower portion for providing a better reflectiveness and a smaller overal height.

The embodiment of FIG. 9 is a modification of that of FIG. 6 and includes a reflective means consisting of an aluminum sheet 37a having a plurality of closely spaced part-spherical bulges to provide an optical arrangement of the type suggested in FIGS. 10 and 11 of my prior U.S. Pat. No. 3,894,791. The further modification of 10 comprises an aluminum sheet 37b shaped to provide a plurality of closely spaced reflective cube-apex type reflectors, associated for example to a core-sheath type rod-like transparent element 30', 30".

I claim:

1. A retroreflective roadway surface marking tape material of the type wherein the tape has a given width and has an upper traffic wear resisting upper layer wherein retroreflective systems each comprising a transparent body of essentially rounded cross-sectional configuration are partially embedded into said upper layer and adjacent to reflective means at least to its embedded surface portion,
    wherein at least a part of said reflective systems comprises a transparent body consisting of an elongated element of transparent material, having a uniform cross-sectional essentially rounded configuration in any plane perpendicular to its major dimension, the said tape systems being secured to said tape upper layer at intervals along the length of the tape in directions essentially perpendicular to the direction in which light rays to be retroreflected are supposed to impinge on the tape in service on a roadway surface.

2. The retroreflective tape material of claim 1, wherein the said transparent elongated element is of length essentially equal to the width of the tape and the said retroreflective systems are arranged on and partially into the said tape upper layer at intervals along the length thereof and are positioned essentially transversally to said length.

3. A retroreflective system for the tape material of claim 1, wherein the said transparent element has a uniform circular cross-sectional configuration.

4. The retroreflective system of claim 3, wherein the element is of core-sheat cross-sectional and comprises an outer transparent layer of index of refraction less than that of the material forming the core portion of same element.

5. The retroreflective tape material of claim 1, wherein the elongated transparent element of at least a part of any of said retroreflective systems is adjacent to reflective means capable of focusing the ray beams impinging on said means upon having refractively travelled through said element.

6. The retroreflective tape material of claim 5, wherein the said focusing reflective means comprise a monolayer of transparent beads adjacent to at least a part of the surface of the element at its portion embedded into the said tape upper layer.

7. The retroreflective tape material of claim 6, wherein the monolayer is closely and uniformly adjacent to said element surface portion.

8. The retroreflective tape material of claim 6, wherein the said transparent element cross-sectional uniform configuration is essentially flattened at said its embedded portion.

9. The retroreflective tape material of claim 5, wherein the said monolayer is superimposed to a sheet of reflective material and the said monolayer and sheet are arranged below the tape upper layer, which is formed of a transparent material.

10. The retroreflective tape material of claim 5, wherein the said focusing reflective means comprise a sheet of reflective material of embossed configuration, including closely and evenly spaced bosses and recesses capable of focusedly reflect the light beams which have refractively travelled through said transparent element.

* * * * *